United States Patent
Banerjee

(10) Patent No.: US 7,061,856 B2
(45) Date of Patent: Jun. 13, 2006

(54) DATA THROUGHPUT OVER LOSSY COMMUNICATION LINKS

(75) Inventor: Debarag N. Banerjee, Milpitas, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 970 days.

(21) Appl. No.: 10/071,557

(22) Filed: Feb. 5, 2002

(65) Prior Publication Data

US 2002/0122385 A1 Sep. 5, 2002

Related U.S. Application Data

(60) Provisional application No. 60/266,719, filed on Feb. 5, 2001.

(51) Int. Cl.
*H04L 12/56* (2006.01)
(52) U.S. Cl. .......................... 370/216; 370/349
(58) Field of Classification Search ............... 370/216, 370/252, 345, 347, 349
See application file for complete search history.

(56) References Cited

U.S. PATENT DOCUMENTS

| | | | |
|---|---|---|---|
| 5,793,768 A | 8/1998 | Keshav | 370/400 |
| 5,974,028 A | 10/1999 | Ramakrishnan | 370/229 |
| 6,038,216 A | 3/2000 | Packer | 370/231 |
| 6,208,620 B1 | 3/2001 | Sen et al. | 370/231 |
| 6,282,172 B1 | 8/2001 | Robles et al. | 370/230 |
| 6,298,041 B1 | 10/2001 | Packer | 370/231 |
| 6,646,987 B1 * | 11/2003 | Qaddoura | 370/231 |
| 6,744,730 B1 * | 6/2004 | Le et al. | 370/229 |
| 6,757,248 B1 * | 6/2004 | Li et al. | 370/235 |
| 6,961,327 B1 * | 11/2005 | Niu | 370/338 |
| 6,975,591 B1 * | 12/2005 | Shorey et al. | 370/229 |
| 2002/0078164 A1 * | 6/2002 | Reinschmidt | 709/217 |
| 2002/0154602 A1 * | 10/2002 | Garcia-Luna-Aceves et al. | 370/230 |
| 2003/0095537 A1 * | 5/2003 | Murakami et al. | 370/349 |

(Continued)

OTHER PUBLICATIONS

Lakshman et al., "Window-Based Error Recovery and Flow Control with a Slow Acknowledgement Channel: A study of TCP/IP Performance," INFOCOM '97, pp. 1199-1209, Apr. 11, 1997.

(Continued)

*Primary Examiner*—Melvin Marcelo
(74) *Attorney, Agent, or Firm*—Lumen Intellectual Property Services, Inc.

(57) ABSTRACT

In a heterogeneous data network including both wired and wireless/lossy links, a transport protocol method implemented at the wireless host is fully compatible with existing wired networks and wireless gateways, and requires no modification to transport protocols at existing wired hosts. The wireless host calculates a temperament parameter [100] characterizing the error-proneness of the data connection and uses this parameter to determine whether error-induced losses or congestion-losses dominate the data connection [110]. If congestion-losses dominate the data connection, then the host uses a standard technique for acknowledging data packets [130]. If, on the other hand, error-induced losses dominate the connection, the host uses a modified technique for acknowledging data packets [120]. According to this modified technique, the wireless host sends a plurality of non-duplicate acknowledgements of a single packet whenever a packet is received after an out-of-order packet is received. By acknowledging distinct fragments of the packet, rather than identical (i.e., duplicate) acknowledgments of the packet, the acknowledgments have the effect of accelerating recovery of maximal window size at the wired host and increasing data throughput.

19 Claims, 2 Drawing Sheets

U.S. PATENT DOCUMENTS

2003/0112754 A1* 6/2003 Ramani et al. ............ 370/230
2004/0264366 A1* 12/2004 Swami ...................... 370/229
2005/0180327 A1* 8/2005 Banerjee et al. ........... 370/236
2005/0268181 A1* 12/2005 Murty et al. ............... 714/704

OTHER PUBLICATIONS

Teunis J. Ott, et al., "The Stationary Behavior of Ideal TCP Congestion Avoidance," DIMACS Workshop on Performance of Real-Time Applications on the Internet, Aug. 22, 1996, pp. 131.

Matthew Mathis, "Windowed Ping: An IP Layer Performance Diagnostic," Computer Networks and ISDN Systems, 27 pp. 449-459, 1994.

Casetti, C. et al., "TCP with Faster Recovery," IEEE, vol. 1, p. 320-4, 2000.

* cited by examiner

DATA THROUGHPUT OVER LOSSY COMMUNICATION LINKS

CROSS-REFERENCE TO RELATED APPLICATIONS

This application claims priority from U.S. Provisional Patent Application No. 60/266,719 filed Feb. 5, 2001, which is incorporated herein by reference.

FIELD OF THE INVENTION

The present invention relates generally to data communication networks such as local area networks and the internet. More specifically, it relates to techniques for improving data throughput over lossy communication links, such as wireless links, within a data communication network.

BACKGROUND OF THE INVENTION

Transmission Control Protocol (TCP) is the most common transport protocol currently used in data communication networks such as the internet. TCP is designed for use in traditional wired networks in which the dominant cause for packet losses and delays is congestion. Congestion occurs, for example, when a transmitting host sends too many packets too quickly over the network to a receiving host, causing some packets to be lost because the receiving host cannot handle such high throughput. In TCP, the receiving host is expected to send acknowledgement signals back to the transmitting host in order to verify that packets have been properly received.

In standard implementations of TCP, transmission of a data stream begins at a transmitter which divides the data stream into segments containing multiple octets. Each segment is then packaged in a packet, which is then sent onto a network for delivery. During transit, intermediate network devices are permitted to break up a packet into fragments and repackage the smaller segment fragments into multiple packets that are then forwarded to the receiver. Since the receiver will then receive multiple packets corresponding to the single original packet sent from the transmitter, there is not necessarily a one-to-one correspondence between packets sent and packets received.

When a packet is received, the receiver sends an acknowledgement signal (ACK) to the transmitter. The ACK acknowledges receipt of the data stream up to a specified octet sequence number. Thus, the ACK normally contains the last octet sequence number of the most recent packet received. However, in cases where a sent packet is split up into multiple packets during transit, the receiver's ACKs of the various fragmented packets (except the last) specify octet sequence numbers that are less than the last octet sequence number in the original sent packet. Thus, these ACKs are not interpreted by the transmitter as acknowledgements of the whole sent packet. In other words, even though these multiple ACKs are derived from a single packet sent from the transmitter, such ACKs are properly interpreted by the transmitter as corresponding to separate fragmented packets received at the receiver. Note, however, that the ACK signals for such split packets have unique octet sequence numbers, and are not mere duplicates. In fact the following section of the TCP specification RFC 793 published by the Internet Engineering Task Force (http://www.ietf.org/) explicitly declares such ACKs as new or acceptable (i.e. non-duplicate) ACKs:

"In response to sending data the TCP will receive acknowledgments. The following comparisons are needed to process the acknowledgments.
SND.UNA=oldest unacknowledged sequence number
SND.NXT=next sequence number to be sent
SEG.ACK=acknowledgment from the receiving TCP (next sequence number expected by the receiving TCP)
SEG.SEQ=first sequence number of a segment
SEG.LEN=the number of octets occupied by the data in the segment (counting SYN and FIN)
SEG.SEQ+SEG.LEN−1=last sequence number of a segment
A new acknowledgment (called an "acceptable ack"), is one for which the inequality below holds:
SND.UNA<SEG.ACK=<SND.NXT"

Note in particular the inequality condition ("less than equal" rather than "equal") in the last equation above. Also note that the "sequence number" referred to is the octet sequence number (and not a packet number), as made clear by the following earlier section of the same document:

"The TCP must recover from data that is damaged, lost, duplicated, or delivered out of order by the internet communication system. This is achieved by assigning a sequence number to each octet transmitted, and requiring a positive acknowledgment (ACK) from the receiving TCP. If the ACK is not received within a timeout interval, the data is retransmitted. At the receiver, the sequence numbers are used to correctly order segments that may be received out of order and to eliminate duplicates."

According to the TCP protocol, the receiver is allowed to send various types of acknowledgment. A cumulative acknowledgment is an acknowledgment of an entire sequence of data bytes, up to a specified octet sequence number. A cumulative acknowledgment indicates an octet sequence number of the next expected data byte. If a packet is received out-of-order (i.e., the first sequence number of a new packet does not match the sequence number of the next expected byte), then the receiver normally repeats the most recent acknowledgement. Such a duplicate acknowledgments indicates to the transmitter that a packet was lost. It also assumes the packet was lost if the transmitting host receives no acknowledgement before the expiration of a timeout interval.

In TCP, rather than waiting for an acknowledgment of each packet before sending another packet, the transmitting host continues to send packets, stopping only if the number of unacknowledged packets exceeds a specified window size. The transmitting host dynamically adjusts the window size using a flow control technique. When there is no loss, the window size is increased. When a loss occurs, the window size is reduced. The particular flow-control technique determines how exactly the window size is reduced upon detection of a congestion error and how the window size back is again increased. For example, TCP-Reno performs a slow-start followed by congestion avoidance in response to time-out, and performs fast-retransmit (i.e., congestion) in response to three duplicate acknowledgements. TCP-Tahoe performs a slow-start followed by congestion avoidance in both cases. The slow-start technique reduces the window size to one and then doubles the window size after each successful transmission.

Because TCP was developed primarily for use on wired networks, it does not perform well when the network includes lossy links, such as wireless links. The primary reason for its poor performance is because TCP flow-control techniques assume that all types of packet loss are due to network congestion. In the case of a wireless link, however, packets may also be lost because of the lossy nature of the connection, and not only because of congestion. Because TCP assumes that congestion is always responsible for losses, it inappropriately responds to packet loss due to wireless fading as if the loss were due to congestion, e.g., by reducing the window size. This rate back-off mechanism causes the TCP throughput to degrade unnecessarily. Consequently, TCP performance in networks having wireless or other lossy links suffers from throughput degradation due to the inappropriate use of congestion compensation techniques.

Known techniques to improve the performance of TCP over wireless links all require both modifications to the wireless host, and also modifications to the wired host and/or to the wireless gateway node. These prior approaches include, for example, transport layer schemes that require alterations to the TCP implementation. Unfortunately, such alterations can lead to network deadlock and might otherwise be impractical due to backward incompatibility with already established internet hosts. Other approaches are split-connection techniques and link-layer techniques. The split-connection approach breaks the TCP connection into two separate connections: a wired connection between the wired host and the wireless gateway, and a wireless connection between the wireless gateway and the wireless host. This approach suffers from the lack of end-to-end semantics since acknowledgements received at the wired host only indicates reception by the wireless gateway, and not necessarily reception by the wireless host. This approach also has the disadvantage that it requires modification of all wireless gateways to manage the split connections. The link-layer techniques use link-layer mechanisms to make the link layer packet loss probability comparable to that of the wireless link. This improves the transport layer interaction at the cost of link layer throughput, and can be inefficient under some circumstances. This approach also has the disadvantage that it requires modification of all wireless gateways to manage the split connections. All the above approaches have the disadvantage that they require modification to the TCP implementation in hosts of the existing wired network, and/or modifications to the wireless gateway.

SUMMARY OF THE INVENTION

In contrast with the prior art, the present invention provides a method for improving throughput in a packet data network without modifying the wired hosts or the wireless gateways. The present invention provides a novel and advantageous approach that only requires modification to the wireless host, and provides full compatibility with existing wired networks and wireless gateways. Also, most prior art involving modifications to the wireless gateways do not effectively address the problem when a multitude of wireless gateways may be present in the path(s) of the packets being transferred between the two hosts.

In a data network comprising a first host (e.g., a wired host), a second host (e.g., a wireless host), and a data connection subject to transmission errors (e.g., including a wired network, a wireless network, and one or more wireless gateways spanning the two), the method is implemented at the second host. The host first determines whether error-induced losses or congestion-losses dominate the data connection. If congestion-losses dominate the data connection, then the host uses a standard technique for acknowledging data packets. If, on the other hand, error-induced losses dominate the connection, the host sends a plurality of non-duplicate acknowledgements of a single packet whenever a packet is received after an out-of-order packet is received. By acknowledging distinct fragments of the packet, rather than identical (i.e., duplicate) acknowledgments of the packet, these non-duplicate acknowledgements of the same packet have the effect of accelerating recovery of maximal window size. In the case of domination by error-induced losses, the host also preferably adjusts the receive window length according to a capacity of the data connection.

In a preferred embodiment of the invention, the host determines whether error-induced losses or congestion-losses dominate the data connection by calculating a temperament parameter characterizing the error-proneness of the data connection. The temperament parameter preferably comprises taking the product of a packet error rate and a square of the delay-bandwidth product.

DETAILED DESCRIPTION

Figure 1:
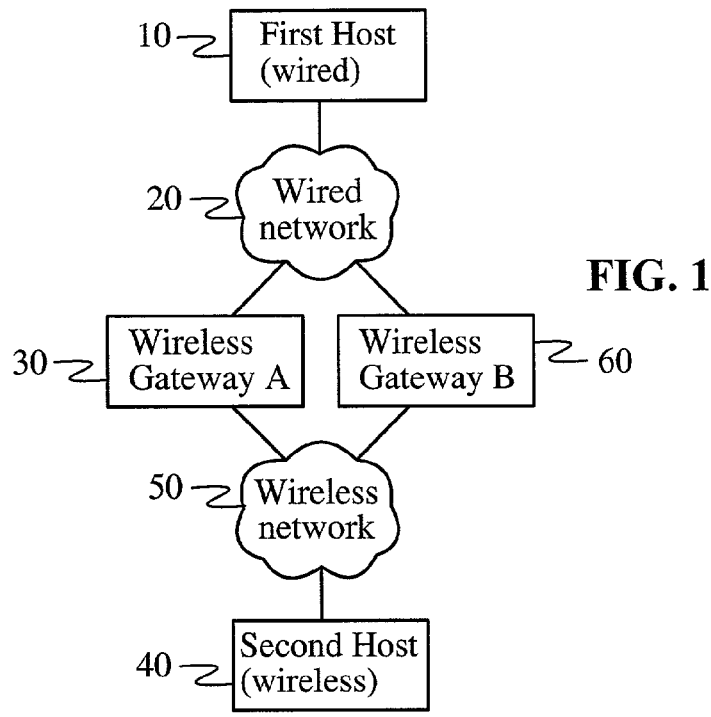
FIG. 1 is a block diagram of an exemplary data communications network in which a preferred embodiment of the present invention may be realized.

Particular embodiments of the present invention will now be described in detail with reference to the drawing figures. FIG. 1 shows a data communications network in which the present invention may be typically realized. A first host 10 is connected via a wired network 20 to a wireless gateway 30. Wireless gateway 30, in turn, is connected to a second host 40 via a wireless network 50. Wireless network 50 comprises of at least one lossy link subject to transmission errors caused by physical effects such as fading, interference, or multipath. In contrast, the link or links between the first host 10 and the wireless gateway 30 are wired links that are not normally subject to significant transmission errors. Host devices 10 and 40 thus transmit and receive digital information through a combination of wired and lossy link segments. The first host 10 is also referred to as a wired host, while the second host 40 is referred to as a wireless host. Wireless gateway 30 is not necessarily unique. There may be one or more other wireless gateways, such as wireless gateway 60, which may provide alternate paths for communication between hosts 10 and 40. It should be understood that the data network of FIG. 1 is a simple illustrative example and that the actual implementation may be more complex. It should also be understood that the wireless gateway and the wired host may be, in some cases, the same machine. In other embodiments, in place of wireless network 50 is a network that contains at least one lossy link, and the second host is not a wireless host but a host connected to the first host via the lossy link.

In the preferred embodiment of the invention, a data connection is established between hosts 10 and 40, and a novel method is used at the host 40 to control the transfer of data packets over the connection. At the wired host 10 standard TCP is used. At the wireless host 40, however, a modified TCP technique is implemented. The modified TCP technique is designed to increase net throughput above the lower levels that would exist if standard TCP were used. It is a central advantage of the present invention that this modification to the TCP need only take place at the wireless host, and is fully compatible with the standard TCP operating at the wired host. Thus, no modifications to the wired host (or gateway) are needed for the improvement in TCP performance. It should be understood, however, that it is not a requirement that standard TCP be used at the wired host.

Figure 2:
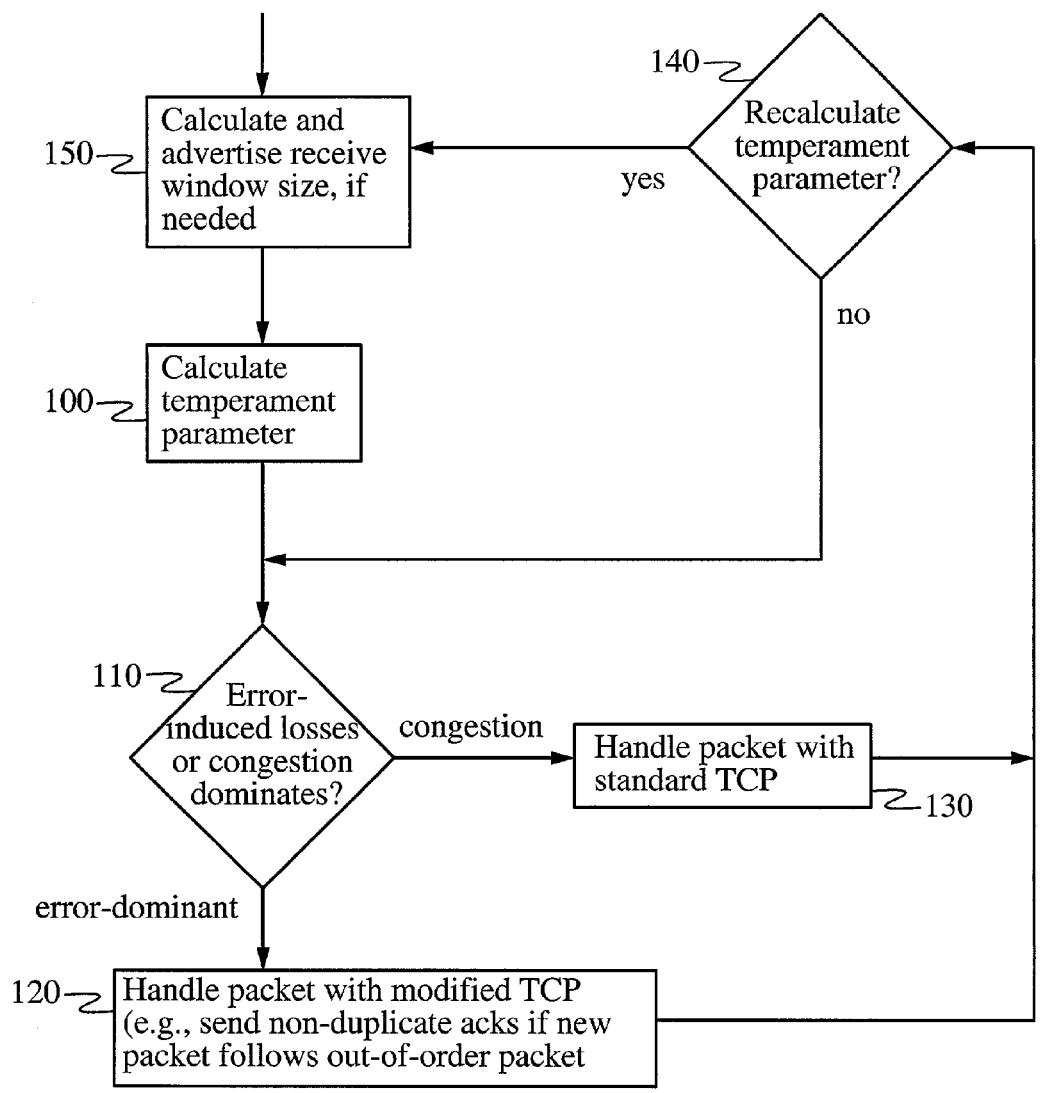
FIG. 2 is a flow chart illustrating steps in a packet transfer protocol method according to an embodiment of the present invention.

A preferred embodiment of the method implemented at the wireless host is illustrated in the flow chart of FIG. 2. The method includes a step 100 wherein a temperament parameter θ is calculated. The temperament parameter is herein defined generally as a quantitative measure characterizing the error-proneness of the data connection. In the preferred embodiment, however, temperament is not a direct measure of the probability of packet failure due to error-induced losses (i.e., due to errors caused by noise, interference, fading, etc. on the lossy link). Instead, temperament is a measure of the contribution of error-induced losses to the reduction of TCP throughput as compared to the contribution of congestion losses. Thus, as the temperament increases, error-induced packet losses become the dominant cause for initiation of window cutback. In a preferred embodiment, the temperament parameter θ is calculated by taking the product of a packet error rate q and a square of the product of link bandwidth μ and round-trip delay T. In other words, $\theta = q(\mu T)^2$. More specific details regarding the calculation of θ are included later in this specification.

After the temperament parameter has been calculated, control shifts at decision step 110 depending on whether error-induced losses or congestion-losses dominate the data connection. This decision is made based on a current value of the temperament parameter. If the temperament parameter exceeds a predetermined threshold value (typically 1), then the reduction of TCP throughput is due more to error-induced losses than to congestion. In this case, control is passed to a step 120 which handles packets according to a modified TCP. Otherwise, control is passed to a step 130 which handles packets according to standard TCP. In either case, after handling the packet, control is passed to a decision step 140 that determines whether or not a new value of the temperament parameter should be calculated. If so, control is passed to blocks 150 and 100. Otherwise, these blocks are by-passed and control is passed directly to block 110. The temperament is preferably computed whenever a connection is initiated, and re-computed during the session to reflect changes in the lossy link. The temperament can be re-computed whenever there is a handoff or other major event, whenever a packet is sent, and/or at fixed time intervals. The particular network characteristics will determine the best conditions for deciding at block 140 whether or not to re-compute the temperament. For example, if the link has a guaranteed quality of service, then it may be sufficient to re-calculate the temperament only for handoff or other major events. When there is no guaranteed quality of service, it is preferably to have more frequent updates of temperament.

Figure 3:
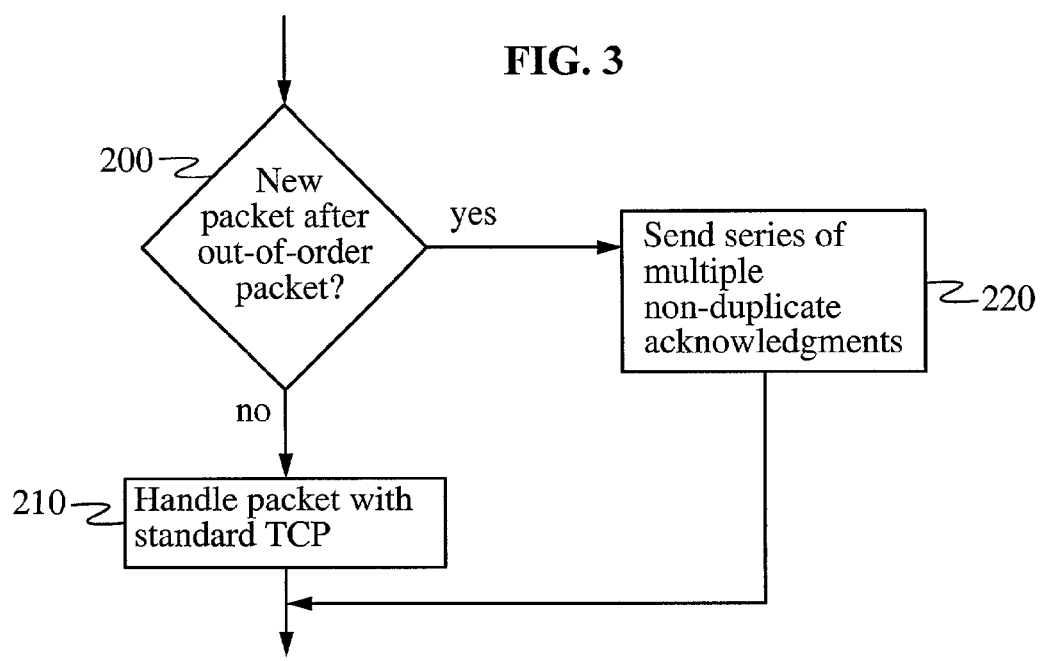
FIG. 3 is a flow chart illustrating details of a step in FIG. 2 which handles a packet according to a modified TCP method, according to an embodiment of the present invention.

The modified TCP protocol of block 120 is identical to standard TCP except for the following details, which are illustrated by the flow chart in FIG. 3. Whenever the wireless host receives a new packet, it checks if the new packet follows an out-of-order packet (decision block 200). If not, control is transferred to block 210 and the packet is handled according to standard TCP. If the new packet does follow an out-of-order packet, however, then control is transferred instead to block 220 where the wireless host sends multiple non-duplicate acknowledgements of the new packet to the wired host. The effect of this is to create a fast rate recovery to compensate for the back-off caused by the initial out-of-order packet. When the out-of-order packet is first received, the wireless host sends duplicate acknowledgements in accordance with the standard TCP fast-transmit algorithm. The wired host interprets these duplicate acknowledgments as an indication of congestion, resulting in a reduction in window size. However, when a new packet is received following the out-of-order packet, the wireless host sends a series of non-duplicate acknowledgments to this single packet, which the wired host interprets as acknowledgments of multiple received packets, resulting in a fast increase in the window size. This artificial quick-recovery happens only when the connection is dominated by error-induced packet losses and the modified TCP is being used. The conventional TCP rate-backoff and recovery algorithms are preserved by the present invention, the key difference being that the recovery is artificially accelerated in the case of domination by error-induced losses. If congestion losses dominate, the method operates as standard TCP.

This modified TCP technique exploits a feature of standard TCP in order to generate multiple non-duplicate acknowledgements of a single packet at the wireless host, thereby deceiving the wired host into quickly increasing the window size. In standard TCP, cumulative acknowledgments make reference not to packet sequence numbers, but rather to octet sequence numbers. Because each packet comprises a plurality of octet fragments, standard TCP permits multiple non-duplicate cumulative acknowledgments of a single packet. Such acknowledgments are also called fragmented acknowledgments, since they acknowledge distinct octet fragments within the same packet. For example, a packet starting with octet sequence number S and finishing with octet sequence number F may be acknowledged with N fragmented acknowledgments making reference to octet sequence numbers $S+(F-S)/N$, $S+2(F-S)/N, \ldots, F$. By fragmenting the packet into octets, the N acknowledgments of the same packet are non-duplicate, and are not interpreted by the wired host as indicating packet loss. Instead, they are interpreted as acknowledgments of separate packets, and result in accelerated increase in window size. Preferably, the N fragmented acknowledgments are sent from the wireless host at equal intervals within a round-trip time T. This results in a dramatic increase in the recovery time as compared to standard TCP. The value of N determines the rate of recovery that is desired, and is selected based on various factors that depend upon the specific nature of the data network, particularly the characteristics of the lossy link. For example, in the case of TCP-Reno, in order to keep the TCP throughput degradation acceptable (say, within η of the maximum throughput) the value of N should be set in proportion to the temperament value θ. In particular, $N=\theta/4\eta$.

Returning now to FIG. 2, at block 150 the host also preferably computes a receive window length according to a capacity of the data connection, and advertises the length if it has changed. In conventional TCP, the wireless host normally would advertise its receive window to be equal to its available buffer space. In the case of a wireless link, however, the buffer space is not likely to be the bottleneck. Instead, the limited link capacity is likely to be the bottleneck. Thus, it makes better sense to set the wireless host receive window according to the capacity of the wireless link data connection rather than according to its buffer capacity, since this will result in less congestion. In other words, if the maximum data rate of the TCP connection over the wireless link is R, and the round-trip delay for the connection is T, then a window size larger than W=RT will likely cause congestion. The round-trip time T is known, and the maximum TCP connection rate R can be calculated from the known values of the maximum link-layer rate $R_L$, frame size FS, maximum segment size MSS, and the IP packet overhead IP. In particular, $R=R_L/[(MSS+IP)/FS]$, where the square brackets indicate the ceiling of the quantity contained within. For multiple TCP connections sharing the same link, the window size $W_i$ for each connection i can be scaled according to the connection's bandwidth-delay product. In particular, $W_i=RT_i(T_i\mu_i/\Sigma_i T_i\mu_i)$, where $T_i$ and $\mu_i$ are the delay and bandwidth, respectively, for connection i. This adjustment of the receive window is preferably performed whenever the multiple non-duplicate acknowledgment technique is used in order to prevent the possibility of congestion breakdown of the IP network due to faster-than-expected recovery.

There may, in general, be many different ways to determine at decision block 110 whether error-induced losses or congestion losses are likely to dominate a lossy connection. In the preferred embodiment of the present invention, this determination is based upon a current value of a temperament parameter calculated at block 100. Other parameters or measures, however, are considered within the scope of the present invention. Preferably, any such parameter or parameters are measured or computed from information normally available at the wireless host, without requiring special requests for additional information from the wired host. For example, in the preferred embodiment of the present invention, the calculation at block 100 of the TCP temperament parameter θ is based on the following information: The effective data rate over the wireless link, μ, the round-trip time, T, and the random packet loss probability, q.

In standard TCP, the value of T is known to the wireless host since it is an essential part of standard TCP. However, in an asymmetric link where the wireless host is primarily receiving, the estimate of T may be inaccurate because a significant time may have passed since the wireless host last transmitted an original packet. To avoid this pitfall, the wireless host preferably sends a "ping" request, or similar benign message, whenever the last update to its round-trip estimate is past a predetermined threshold age. The wired host's acknowledgment to the message then provides an up-to-date estimate of T. The frequency at which these messages should be sent depends on the average rate of fluctuation in the network topology. If, for example, the wireless host performs a handoff, it should update the estimate of T to reflect the new network topology.

The wireless host can easily estimate q from frame error statistics at the data link layer and the known values of the segment size and frame size. The packet loss probability q is defined as the probability of a maximum segment sized packet getting lost during transmission over the lossy link. It can be obtained by conjoining the frame error probability of the number of data link frames that would be needed to transfer such a packet. For example, let M be the maximum segment sized packet in bytes (including TCP and IP headers), let F be the data link frame size, having a frame error rate (after any FEC coding and/or ARQ) of $P_f$. Then $q=1-(1-P_f)^{[M/F]}$, where the square brackets again signify the ceiling of the quantity contained within.

The wireless host can determine μ from the packet arrival rate. Preferably, the value of μ is calculated at the wireless host transport layer by maintaining a running average of the number of octets of transport layer data (including acknowledgments and duplicate segments) arriving per second, which it will update every time a new packet arrives. This octet rate is then normalized with the maximum segment size to arrive at the desired packet data rate. Although this measure does not count the packets that get lost at the wireless link, this is not expected to cause any significant errors in the estimation since the packet loss probability q is normally much less than 1.

Those skilled in the art will appreciate that many details discussed in relation to the above embodiments of the invention may be altered in various ways without departing from the essential features of the invention. For example, the principle ideas of the present invention will work on any transport layer mechanism where an end-to-end acknowledgment-based rate-backoff mechanism is used and where the acknowledgments are designed to be cumulative in nature and can acknowledge parts of packets. Thus, the above description represents a particular instantiation of the invention for TCP, and many other instantiations are possible. Accordingly, the scope of the invention is not limited to the specific details included above for illustrative purposes, but is determined from the following claims.

The invention claimed is:

1. In a data network comprising a first host, a second host, and a data connection between the first host and the second host, a method implemented at the second host comprising:
    a) determining whether error-induced losses or congestion-losses dominate the data connection;
    b) if congestion-losses dominate the data connection, using a standard transmission protocol technique for acknowledging packets; and
    c) if error-induced losses dominate the connection, sending a plurality of non-duplicate acknowledgements of a single packet whenever a packet is received after an out-of-order packet is received.

2. The method of claim 1 wherein determining whether error-induced losses or congestion-losses dominate the data connection comprises calculating a temperament parameter characterizing an error-proneness of the data connection.

3. The method of claim 2 wherein calculating the temperament parameter comprises taking the product of a packet error rate and a square of a delay-bandwidth product.

4. The method of claim 2 further comprising periodically re-calculating the temperament parameter.

5. The method of claim 2 wherein calculating the temperament parameter uses information normally available at the second host, exclusive of additional information obtained by special request from the first host.

6. The method of claim 1 wherein the standard technique for acknowledging packets is TCP.

7. The method of claim 1 further comprising if error-induced losses dominate the connection, adjusting the receive window length according to a capacity of the data connection.

8. The method of claim 7 wherein adjusting the receive window length comprises calculating a window size W=RT, where R is a maximum data rate of the data connection over the wireless link, and T is a round-trip delay for the data connection.

9. The method of claim 1 wherein the plurality of non-duplicate acknowledgements of the single packet comprise N acknowledgements, where N is related to a calculated temperament parameter.

10. The method of claim 1 wherein sending a plurality of non-duplicate acknowledgements of a single packet comprises sending the plurality of non-duplicate acknowledgments at equal intervals within a round-trip time T.

11. A method for providing a packet transport protocol within a data communication network having a first host, a second host, and a lossy link connected to the second host, the method comprising using a standard transport protocol at the first host, and using a modified transport protocol at the second host, wherein the modified transport protocol comprises sending a plurality of non-duplicate acknowledgements of a single packet whenever error-induced losses dominate the data connection and a new packet is received after an out-of-order packet is received.

12. The method of claim 11 further comprising calculating a temperament parameter characterizing an error-proneness of the data connection.

13. The method of claim 12 wherein calculating the temperament parameter comprises taking the product of a packet error rate and a square of the delay-bandwidth product.

14. The method of claim 11 wherein the modified transport protocol comprises adjusting the receive window length of the second host according to a capacity of the data connection if error-induced losses dominate the connection.

15. The method of claim 11 wherein the standard transport protocol is TCP.

16. A method for acknowledging packets in a data communications host communicating over a lossy data connection, the method comprising: if error-induced losses dominate the data connection, sending a plurality of non-duplicate acknowledgements of a single packet in response to receiving a new packet after receiving an out-of-order packet.

17. The method of claim 16 further comprising calculating a temperament parameter characterizing an error-proneness of the data connection.

18. The method of claim 17 wherein calculating the temperament parameter comprises taking the product of a packet error rate and a square of a delay-bandwidth product.

19. The method of claim 17 further comprising: if error-induced losses dominate the data connection, adjusting the receive window length of the host according to a capacity of the data connection.

* * * * *